Oct. 18, 1955  J. PERDUE  2,720,865
FLUID PRESSURE OPERATED CONTROL SYSTEMS
Filed Jan. 3, 1951  3 Sheets-Sheet 1
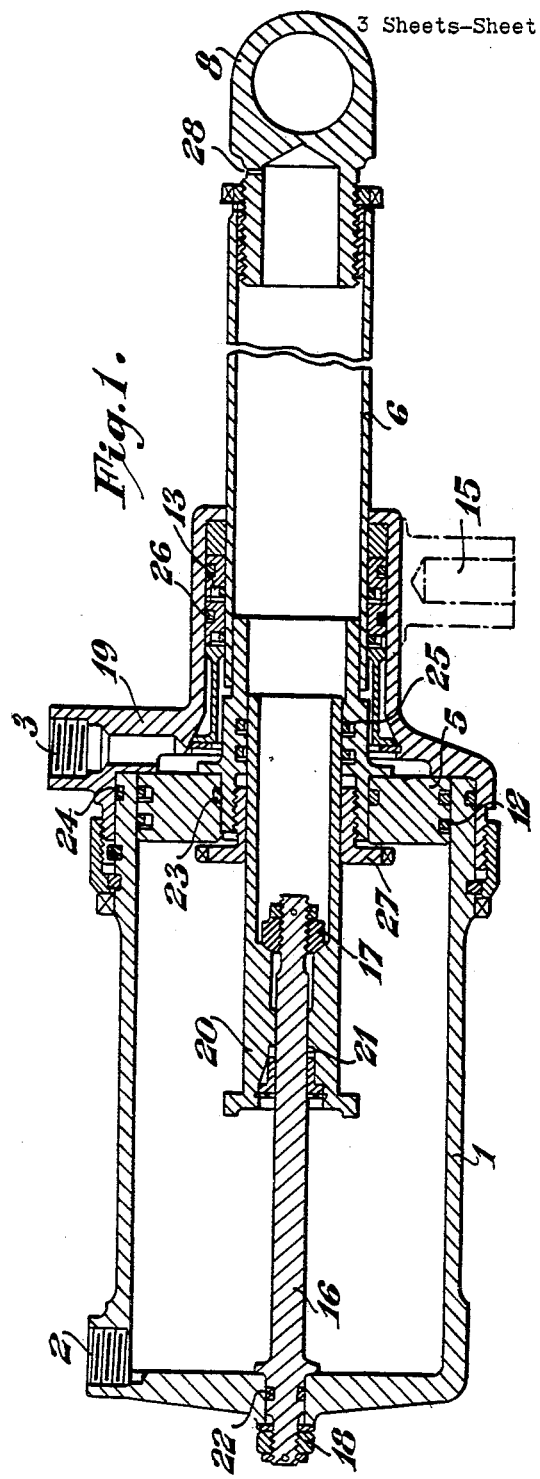
Inventor: Jack Perdue.
By Baldwin & Wight, Attys.

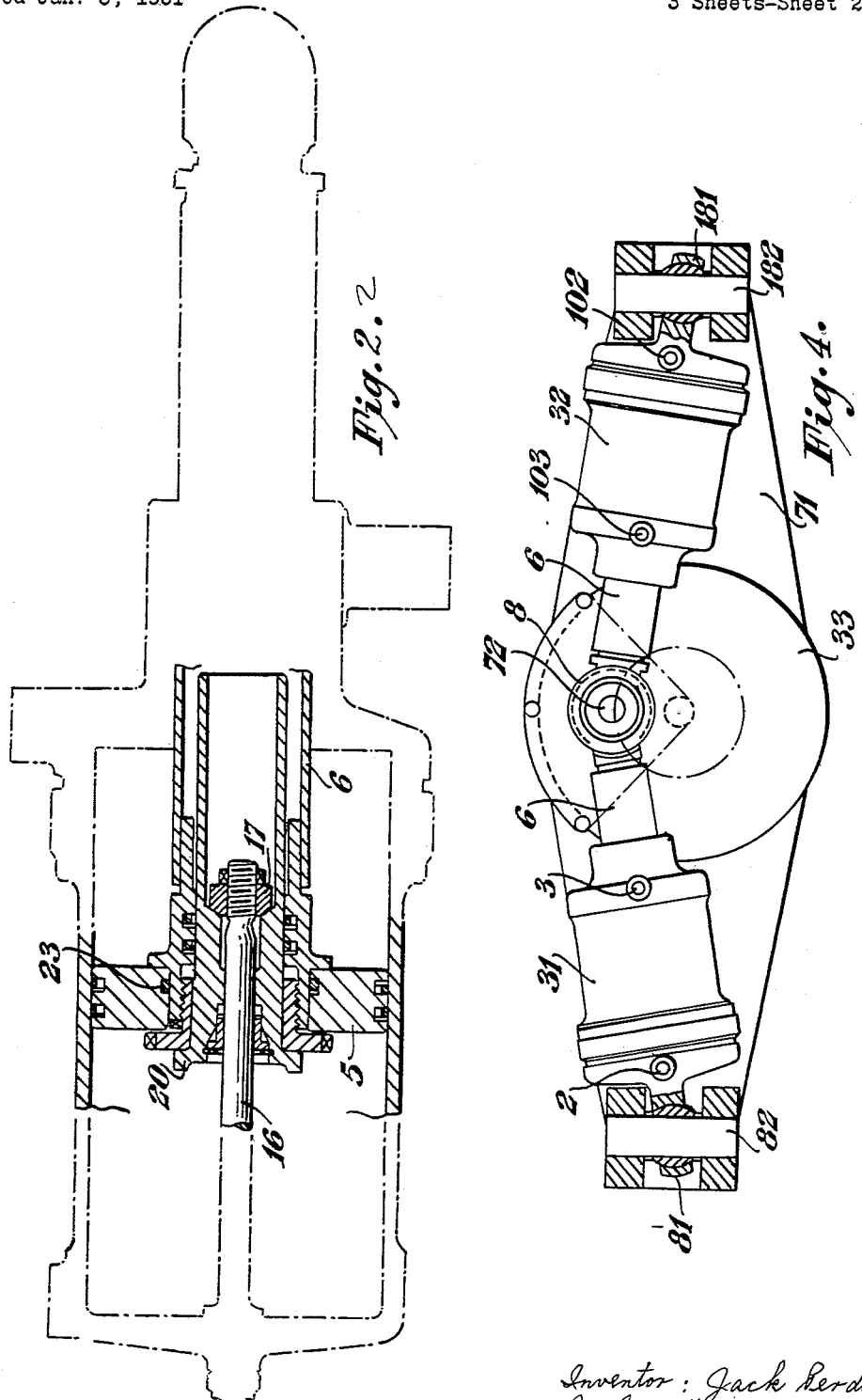

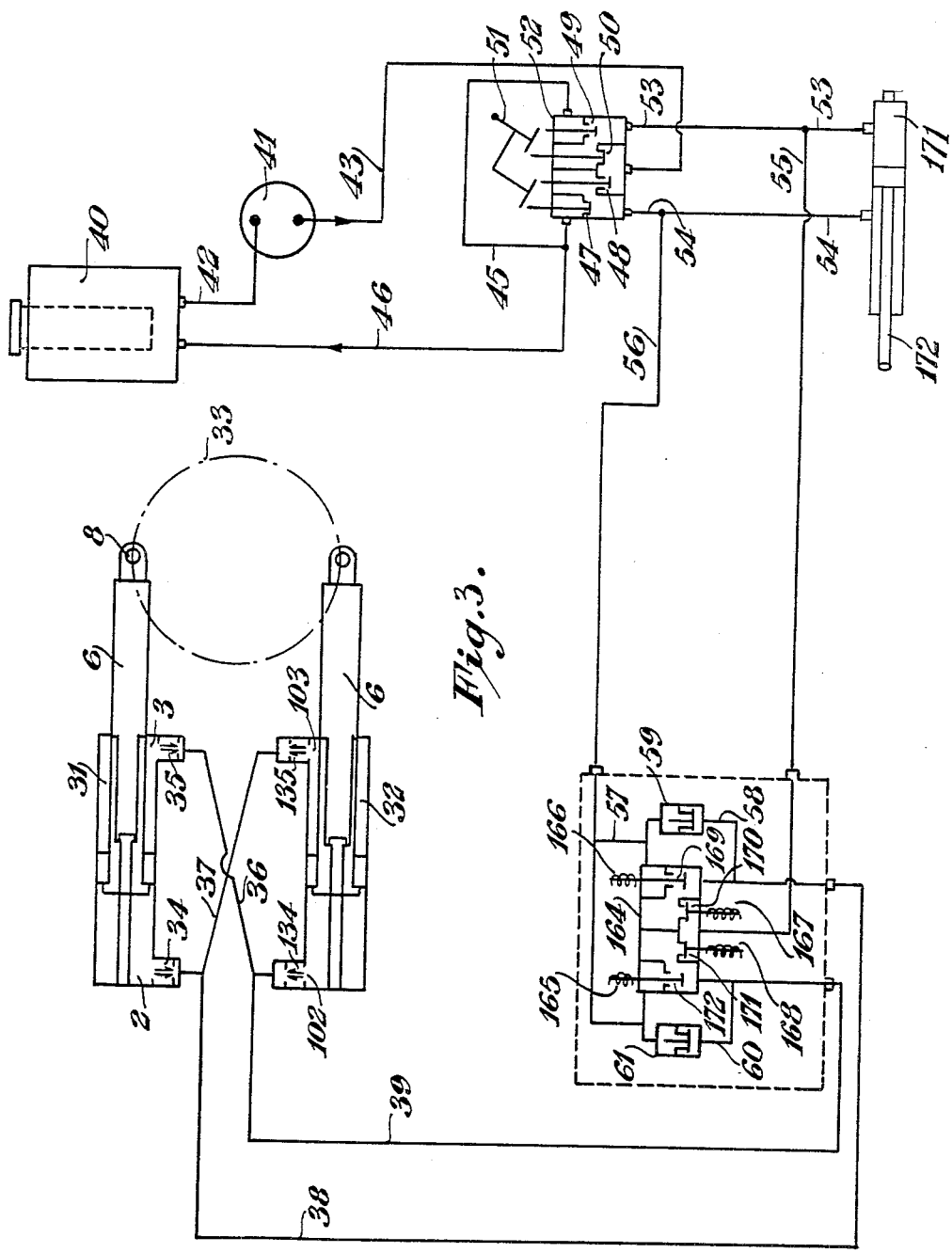

United States Patent Office 2,720,865
Patented Oct. 18, 1955

2,720,865

FLUID PRESSURE OPERATED CONTROL SYSTEMS

Jack Perdue, Great Sankey, Warrington, England, assignor to Electro-Hydraulics Limited, Warrington, England, a company of Great Britain Application January 3, 1951, Serial No. 204,121

8 Claims. (Cl. 121—38)

This invention relates to fluid pressure operated control systems which may include a jack system or a selector control valve system or both and is concerned with the provision in such systems of means which will allow the system to operate in at least one additional intermediate position besides the two extreme positions conventional for such systems.

The invention is particularly useful for incorporation in aircraft systems for flaps which should be capable of movement into a retracted position and two operative positions; for nosewheel steering, which should be capable of movement into a required angular position and a neutral centralising position; or for incorporation in machine tools which are required to have one neutral position and at least two operative positions.

Two positions of a system are to be defined, according to this invention, by the limits of the stroke of a sliding piston or piston assembly, while the third or other intermediate positions can be obtained by a floating piston sliding within the piston or piston assembly and having the limit of its travel defined by a stop or stops within the piston or piston assembly and/or the jack or selector valve cylinder.

According to this invention, a fluid pressure operated control system comprises a cylinder, a piston or piston assembly slidable therein and a floating piston within the said piston or piston assembly, pressure supplied to one or the other side of the piston assembly being capable of moving the said piston or piston assembly to one or the other end of its stroke, while fluid pressure applied to both sides of the piston or piston assembly or to the floating piston alone is adapted to move the piston or piston assembly to an intermediate position within the cylinder.

In one arrangement the piston assembly slidable within a jack cylinder comprises a piston and hollow piston rod in which latter is arranged the floating piston, the piston assembly dividing the system into three main pressure spaces, so that pressure supplied to either of two of the spaces acts on the piston or piston assembly to move it to one or the other end of its stroke, whilst fluid pressure applied to the third space urges the floating piston against a stop in the hollow piston rod, and thus moves the piston assembly to an intermediate position within the cylinder to obtain the intermediate operative position.

In another arrangement, the piston assembly again comprises a piston and hollow piston rod, the floating piston being hollow and slidable within the piston assembly between two stops, one of which is provided by one end wall of the cylinder; the other is formed on a plunger member on which the floating piston slides.

The invention is diagrammatically illustrated in the accompanying drawings in which Figures 1 and 2 are sectional views of a preferred form of the invention, Figure 1 showing the relative position of the parts at one end stroke, and Figure 2 showing the relative position of the parts at an intermediate position. Figure 3 shows the fluid pressure operated control system as applied to the steering of an aircraft leg, Figure 4 being a similar arrangement showing the steering as applied to the steering of an aircraft leg capable of castoring fully.

Referring to Figure 1, the fluid pressure operated control system comprises a jack including a cylinder 1 having at each end a fluid connection 2, 3. Slidable within the cylinder 1 is a sliding piston assembly which is constituted by a piston 5 and a hollow piston rod 6. The hollow piston rod 6 passes out of the cylinder 1 and is provided at its end with an attachment lug 8.

The device is provided with a trunnion 15 for attachment to any fixed point. The connection 3 communicates with the cylinder bore, although it is formed in an end fitting 19 secured so as to close the cylinder 1.

Passing through the glanded bore of the end fitting 19 is the hollow piston rod 6 onto which is fixed by a screw 27 the hollow piston 5, the piston 5 and piston rod 6 constituting a piston assembly. Sliding within the piston assembly is a hollow floating piston 20, one end of its travel being limited by the end wall of the cylinder, the other by a nut 17 screwed onto a plunger 16 which is held onto the cylinder wall by a nut 18. Glands 12, 13, 21, 22, 23, 24, 25 and 26 provide fluid tight seals. Fluid pressure behind the floating piston and in the piston rod 6 can be exhausted into atmosphere through a breeze hole 28 in attachment 8.

The system works as follows: Assuming the jack to be fully retracted and it is desired to extend the jack, fluid pressure is admitted to the cylinder bore through the connection 2. Pressure on the underside of the piston 5 is allowed to exhaust to tank or atmosphere through connection 3. The fluid pressure entering through connection 2 will act on the full area of the cylinder bore, less the area of the plunger 16, until the floating piston 20 contacts the stop 17 (as seen in Figure 1), after which fluid pressure acts on the area of the piston assembly to extend the jack to the end of its stroke, fluid pressure behind the floating piston 20 being exhausted to atmosphere through the breeze hole 28.

In order to retract the jack, fluid pressure is admitted at connection 3 and allowed to exhaust through connection 2; the fluid pressure will act on the piston 5 and move it inwardly into the cylinder, carrying the floating piston 20 with it until the end of the inward stroke, thus closing the jack.

In order to obtain functioning of the jack to attain an intermediate position, fluid pressure is supplied simultaneously to the connections 2 and 3, when the jack is retracted. The said pressure will move the piston 5 and the piston rod 6 to the right, due to the difference in areas onto which the fluid pressure is applied. At first fluid pressure from the connection 2 will act on the full area of the cylinder bore less the area of plunger 16, that is the area of the left hand side of the piston 5 plus the area of the floating piston 20, and this pressure will be opposed by the pressure from connection 3 acting on the right hand side area of the piston 5. When the floating piston 20 contacts its stop 17, however, as illustrated in Figure 2, fluid pressure will then act on the left hand area of the piston 5 only, being opposed by the area on the right hand side of the piston 5, which is smaller only by the annular area of the piston rod 6. The pressure on the area of the ring (annular) area of the hollow piston rod 6 is not sufficient to overcome friction and the load of the object attached to attachment 8 and therefore the piston 5 will come to a stop at a third intermediate position indicated in Figure 2.

The construction of the jack illustrated in Figures 1 and 2 as applied to the steering of an aircraft leg is shown in Figure 3. Referring to Figure 3, two jacks 31 and 32 are pivotally connected to the steerable and castoring undercarriage leg 33. Fluid pressure inlet 3 of jack 31 and fluid pressure inlet 102 of jack 32 are connected by pipeline 36, and similarly fluid pressure inlet 103 of jack 32 and fluid pressure inlet 2 of jack 31 are connected by pipeline 37. Each fluid pressure inlet is provided with a non-return restrictor valve, designated as 34, 35, 134, 135. Liquid from a storage tank 40 is delivered by line 42 to a pump 41 and from there by pipe line 43 into an undercarriage selector 52 from where it can pass either through valve 48 and pipe line 54 to raise the undercarriage or through valve 50 and pipe line 53 to lower the undercarriage, according to actuation of the selector. The undercarriage raising and lowering means is shown diagrammatically in Figure 3 as comprising a cylinder 171 in which is operable a piston 172, the lines 53 and 54 being connected to opposite ends of the cylinder 171. Tank valves 47 and 49 of the undercarriage selector 52 allow fluid to return to the tank by pipe line 46, pipe line 45 interconnecting the two tank valves. Fluid pressure from the undercarriage down line 53 can pass through a branch pipe line 55 into the underside of a steering selector 164 and from there to the steering jacks 31 and 32 through valves 170 and 171 so that the leg 33 can be steered when the undercarriage is lowered. The steering and the manner of operation is preferably of a type as disclosed in the specification of the co-pending U. S. application of Kenneth George Hancock, Serial No. 54,641 filed October 14, 1948, and now abandoned, and is not further explained here as it forms no part of this invention. It should, however, be understood that other types of steering or undercarriage selectors could be used for this invention. When the undercarriage selector 52 is selected for the raising of the undercarriage, fluid pressure will pass from pipe line 54 through pipe lines 56 and 57 into the top side of the steering selector 164 and then through valves 169 and 172 and pipe lines 38 and 39 into the steering jacks 31 and 32 to act on both sides of the respective jack piston and thus centre the undercarriage leg 33. A pipe line 60 connects both sides of the valve 172 in order to cater for an increased fluid flow when the undercarriage 33 is castoring and a non-return valve 61 in this pipeline 60 allows flow in one direction only. In the same way valve 169 can be by-passed by pipeline 58 in which again is a non-return valve 59.

It will be seen from Figure 3 that the undercarriage leg 33 is able to castor over a limited angle only. If it is desired to allow for castoring over 360 degrees, the steering jacks may be mounted as illustrated in Figure 4. The cylinders of the jacks 31 and 32 are provided with attachment legs 81 and 181 respectively connected pivotally to a yoke 71 by pins 82 and 182. The yoke 71 is pivotally connected to the aircraft (not shown) and in the yoke is rotatably mounted the undercarriage leg 33 to which is fixed a pin 72, on which are pivotally mounted the eyebolt attachments 8 of both jacks 31 and 32. Parts shown in this figure, which are counterparts of others shown in the other figures, are identified by the same reference numerals.

I claim:

1. A fluid pressure operated control system comprising a cylinder, a piston, having a hollow piston rod, slidably mounted in said cylinder dividing the latter into a pair of spaces, a stationary plunger, a floating piston slidably mounted in said plunger, there being a stop on said plunger engageable with said floating piston, and connection means for said cylinder spaces for controlling the supply of fluid under pressure thereto, said floating piston from its point of engagement with the stop on said plunger to one end of said cylinder being engageable with said piston to form a part of the pressure area thereof facing said one end of said cylinder whereby the supplying of pressure to either cylinder space will move said piston from the adjacent end of said cylinder to the other end of said cylinder and the supplying of pressure to both of said cylinder spaces when said piston is at said one end of said cylinder will move said piston to an intermediate position at which said floating piston engages said stop whereby the effective pressure area at said side of said piston will be reduced and movement of said piston will stop at such intermediate position.

2. A fluid pressure power device comprising a cylinder, a main piston slidable in said cylinder and including a tubular piston rod, a floating piston slidable in said piston rod and having a portion engageable with one side of said main piston to form during one portion of the stroke thereof a part of the pressure surface of said side of said piston, inlets for admitting fluid pressure into the ends of said cylinder, and means for limiting movement of said floating piston away from the end of said cylinder corresponding to said side of said piston whereby, when fluid is admitted into either end of said cylinder said main piston will move to the other end of its stroke and when said piston is at the end of said cylinder corresponding to said side of said piston and fluid is admitted into both ends of said cylinder, the means for limiting movement of said floating piston will disengage said floating piston from said main piston to reduce the effective pressure area of said side thereof.

3. A fluid pressure power device constructed in accordance with claim 2 wherein the means for limiting movement of said floating piston comprises a rod fixed at one end to one end of said cylinder axially thereof and slidable in the said floating piston, said rod having a stop engageable with said floating piston interiorly thereof.

4. A fluid pressure operated control system comprising a pair of power devices each comprising a cylinder, a main piston having a hollow piston rod slidably mounted in said cylinder and dividing the latter into a pair of spaces, a stationary plunger, a floating piston slidably mounted in said plunger and having a stop engageable with said floating piston, and connection means for said cylinder spaces for controlling the supply of fluid under pressure thereto, said floating piston from its point of engagement with said stop on said plunger to one end of said cylinder being engageable with said main piston to form a part of the pressure area thereof facing said one end of said cylinder whereby the supplying of pressure to either cylinder space will move said main piston from either end of said cylinder to the other end of said cylinder and the supplying of pressure to both of said cylinder spaces when said main piston is at said one end of said cylinder will move said main piston to an intermediate position at which said floating piston engages said stop whereby the effective area at said side of said main piston will be reduced and movement of such piston will stop at said intermediate position, and a control valve mechanism comprising means for simultaneously supplying pressure fluid to one end of the cylinder of one power device and to the opposite end of the cylinder of the other power device.

5. A system as claimed in claim 4 wherein said control valve mechanism comprises means for simultaneously supplying pressure to both ends of both of said cylinders.

6. A system as claimed in claim 4 in which the piston rods of both power devices are pivotally connected to a device to be operated, such device being mounted to turn on a predetermined axis parallel to and eccentric to the pivotal connections of said piston rods thereto, and a control valve mechanism having means for simultaneously supplying fluid pressure to one end of the cylinder of one power device and to the opposite end of the cylinder of the other power device.

7. A system as claimed in claim 4 in which the piston rods of both power devices are pivotally connected to a device to be operated, such device being mounted to turn on a predetermined axis parallel to and eccentric to the pivotal connections of said piston rods thereto, and a control valve mechanism having means for simultaneously supplying fluid pressure to one end of the cylinder of one power device and to the opposite end of the cylinder of the other power device, said control valve mechanism further comprising means for simultaneously supplying fluid pressure to both ends of both cylinders.

8. In combination with a device to be operated, wherein said device is mounted to partake of two movements one of which is a linear movement and the other of which is a rocking movement on a predetermined axis, said device having a main control valve mechanism operative for selectively moving said device in either direction in said linear movement, a pair of fluid pressure power devices each comprising a cylinder, a main piston having a hollow piston rod slidably mounted in said cylinder, a stationary plunger having a stop, a floating piston slidably mounted on said plunger and engageable with said stop, and connection means for controlling the supply of fluid to the ends of said cylinder, said floating piston from its point of engagement with said plunger stop to one end of said cylinder being engageable with said main piston to form a part of the pressure area thereof facing said one end of said cylinder whereby the supplying of pressure to said one end of said cylinder will move said main piston to the other end of said cylinder and the supplying of pressure to both ends of said cylinder, when said main piston is at said one end thereof, will move said main piston to an intermediate position at which said floating piston engages said stop whereby the effective pressure area at said side of said main piston will be reduced and movement of such piston will stop at said intermediate position, and an auxiliary control valve mechanism connected to said main control valve mechanism whereby operation of the latter to effect said linear movement of said device in one direction renders said auxiliary control valve mechanism operative for simultaneously supplying pressure fluid to one end of the cylinder of either power device and to the other end of the cylinder of the other power device, said auxiliary control valve mechanism having means for admitting pressure fluid to both ends of both cylinders when said main control valve mechanism effects said linear movement of said device in the other direction.

References Cited in the file of this patent

UNITED STATES PATENTS

| 1,799,298 | Jakob | Apr. 7, 1931 |
| 2,005,387 | Pelton | June 18, 1935 |
| 2,401,197 | Simpson | May 28, 1946 |
| 2,478,790 | Stephens | Aug. 9, 1949 |
| 2,484,603 | Audemar | Oct. 11, 1949 |
| 2,489,450 | Crookston | Nov. 29, 1949 |
| 2,527,943 | Lee | Oct. 31, 1950 |

FOREIGN PATENTS

| 625,711 | Great Britain | July 1, 1949 |